Feb. 19, 1952     F. C. SCHWANEKE     2,586,101
DRINK MIXER
Filed June 15, 1948     3 Sheets-Sheet 1
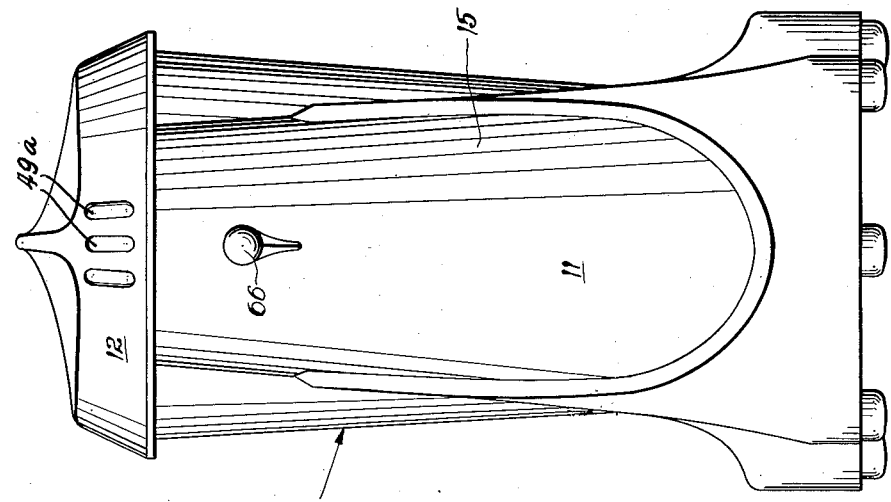
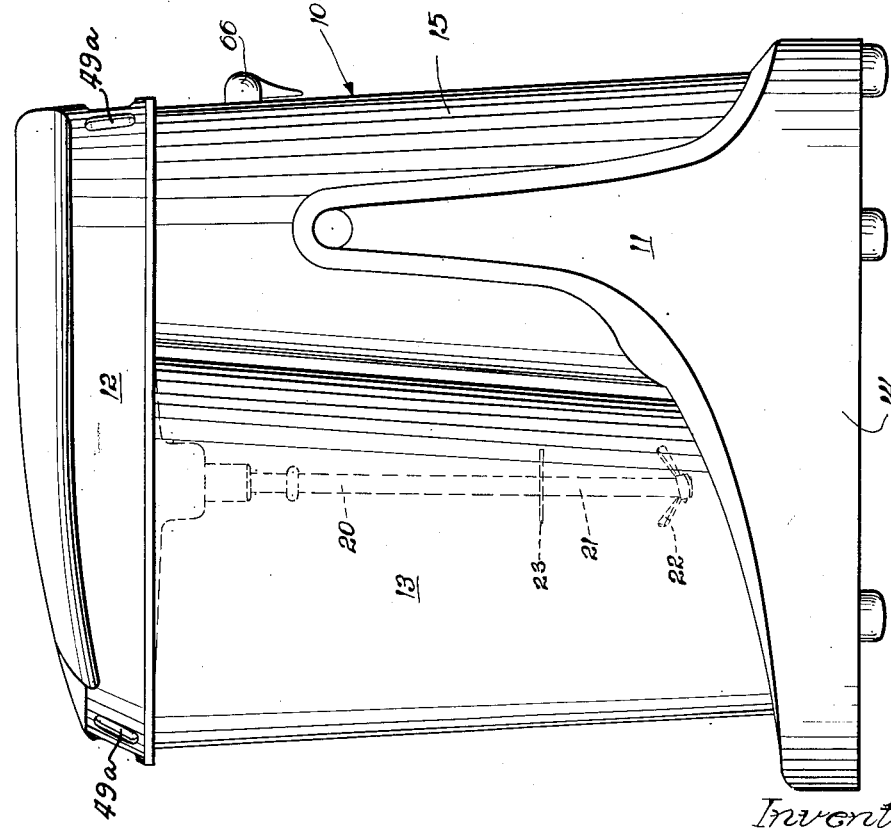
Inventor:
Fred C. Schwaneke.

Inventor:
Fred. C. Schwaneke.

Feb. 19, 1952      F. C. SCHWANEKE      2,586,101
DRINK MIXER
Filed June 15, 1948      3 Sheets-Sheet 3
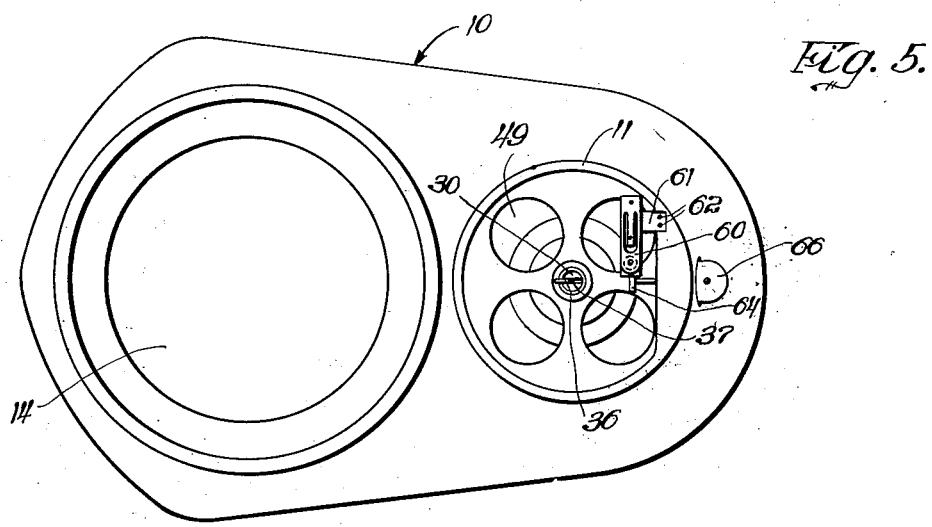
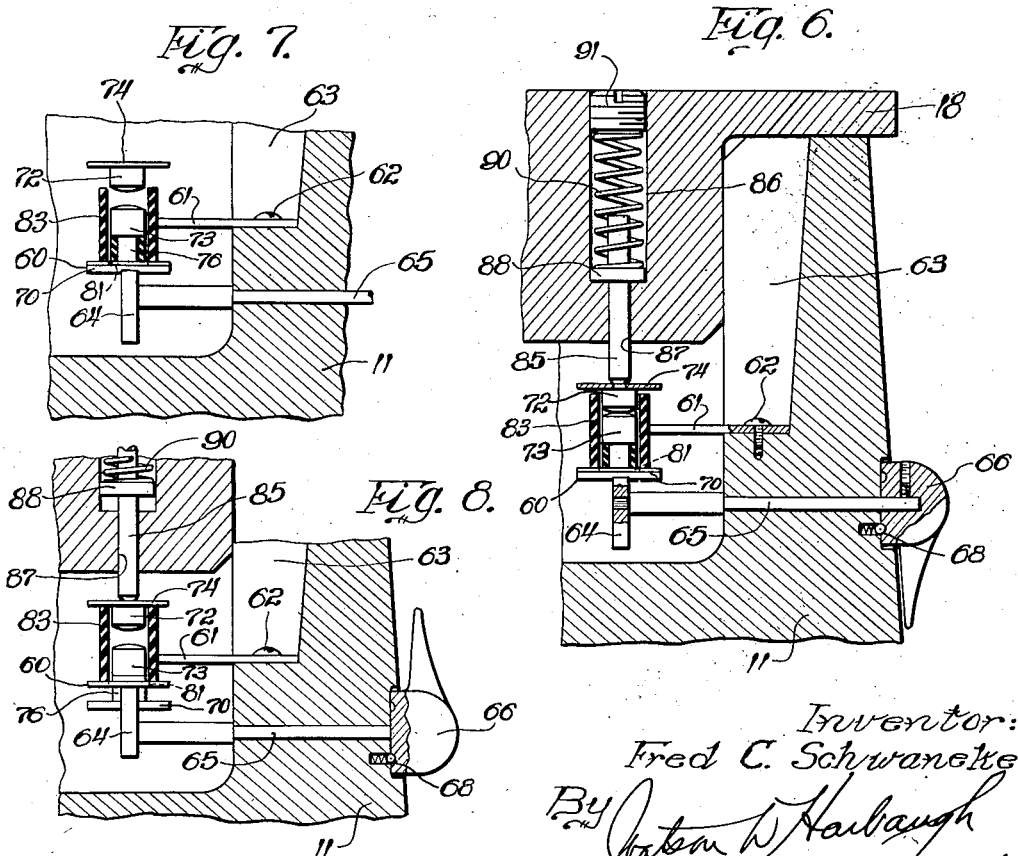

Patented Feb. 19, 1952

2,586,101

UNITED STATES PATENT OFFICE 2,586,101

DRINK MIXER

Fred C. Schwaneke, Chicago, Ill., assignor to Dormeyer Corporation, Chicago, Ill., a corporation of Illinois Application June 15, 1948, Serial No. 33,191

4 Claims. (Cl. 259—108)

This invention relates generally to mixers and more particularly to an improved drink mixer which is intended for use in homes, restaurants, drug stores, bars, etc.

Conventional drink mixers of this type usually comprise a motor supported on an upright stand and a cup or mixing vessel supported by the stand directly below the motor. A rotary agitator shaft extends from the motor into the cup and has an impeller on its lower end. Another form of mixer which has more recently been developed comprises a housing enclosing a vertical shafted motor and removable mixing cup which is mounted on top of the housing, the agitator shaft being journaled in the bottom of the cup and directly coupled to the motor shaft which extends through the top of the housing. Both types of mixers have the disadvantage of standing quite high because the cup and motor are disposed one on top of the other, and they are, therefore, unstable and not compact.

The mixer of this invention differs from the two conventional types described above in that the motor and the mixing vessel are more compactly arranged in a side by side relationship, the motor being supported within a casing and the mixing vessel resting on a platform formed on the casing. The agitator shaft depends into the mixing vessel from a transmission housing removably secured to the top of the motor containing part of the casing.

One object of this invention is to provide a drink mixer having a removable element detachably connected to the motor casing and supporting a rotary agitator which depends into the mixing vessel.

Another object is to provide a removable agitator carrying element which contains a power transmission for transmitting rotary motion from a drive shaft to an agitator shaft.

Another object is to provide a drink mixer having a removable agitator carrying element which is detachable and connected to a motor so that the agitator may be readily removed from the mixing vessel.

Another object is to provide a fan element on the motor shaft located within the casing which also serves to force an air stream through the transmission housing to cool the parts thereof.

Another object is to provide a transmission housing which is removably attached to the top of the motor casing and which covers the top of the mixing vessel thereby preventing the drink being mixed from splashing outside of the vessel when the agitator supported by said housing is rotated.

A further object is to provide a novel power transmission arrangement wherein identical parts may be employed on the driving as well as the driven end for coupling the driver element to the transmission and for coupling the driven element to the transmission.

Another object is to provide a novel control switch which prevents the motor's being energized except when the power transmission is connected thereto.

Another object is to provide a unitary switch which is actuated by both the manual control knob and a member supported by the transmission housing.

Another object is to provide a single switch which performs the function of two switches connected in series.

Another object is to provide a unitary switch which can not be closed unless two conditions are fulfilled, namely: (1) A manually actuated lever is moved, and (2) the transmission housing is mounted on the top of the motor casing thereby preventing the energization of the motor in those times when it is not under load. Drink mixers are usually provided with series wound universal motors, and, since a series motor when operated under no load conditions tends to accelerate to an infinite speed, it is particularly important to avoid energizing the motor under no load conditions since centrifugal force may cause disintegration of the rotor or damage to the bearings when the speed becomes excessive.

Other and additional objects and advantages of this invention will present themselves to those familiar with the art on reading the following specification in conjunction with the drawings and the appended claims.

In the drawings:

Fig. 1 is a side view of the mixer of this invention;

Fig. 2 is an end view of the mixer of this invention;

Fig. 5 is a top view of the mixer of this invention with the transmission housing removed;

Fig. 6 is an enlarged partial section showing the disposition of the switch within the mixer, the switch being in the closed position;

Fig. 7 is a view similar to Fig. 6 showing the position of the various switch elements when the transmission housing is removed and the switch knob is in the "on" position; and Fig. 8 is a view similar to Fig. 6 showing the position of the switch elements when the transmission housing is in place and the switch knob is in the "off" position.

Figure 3:
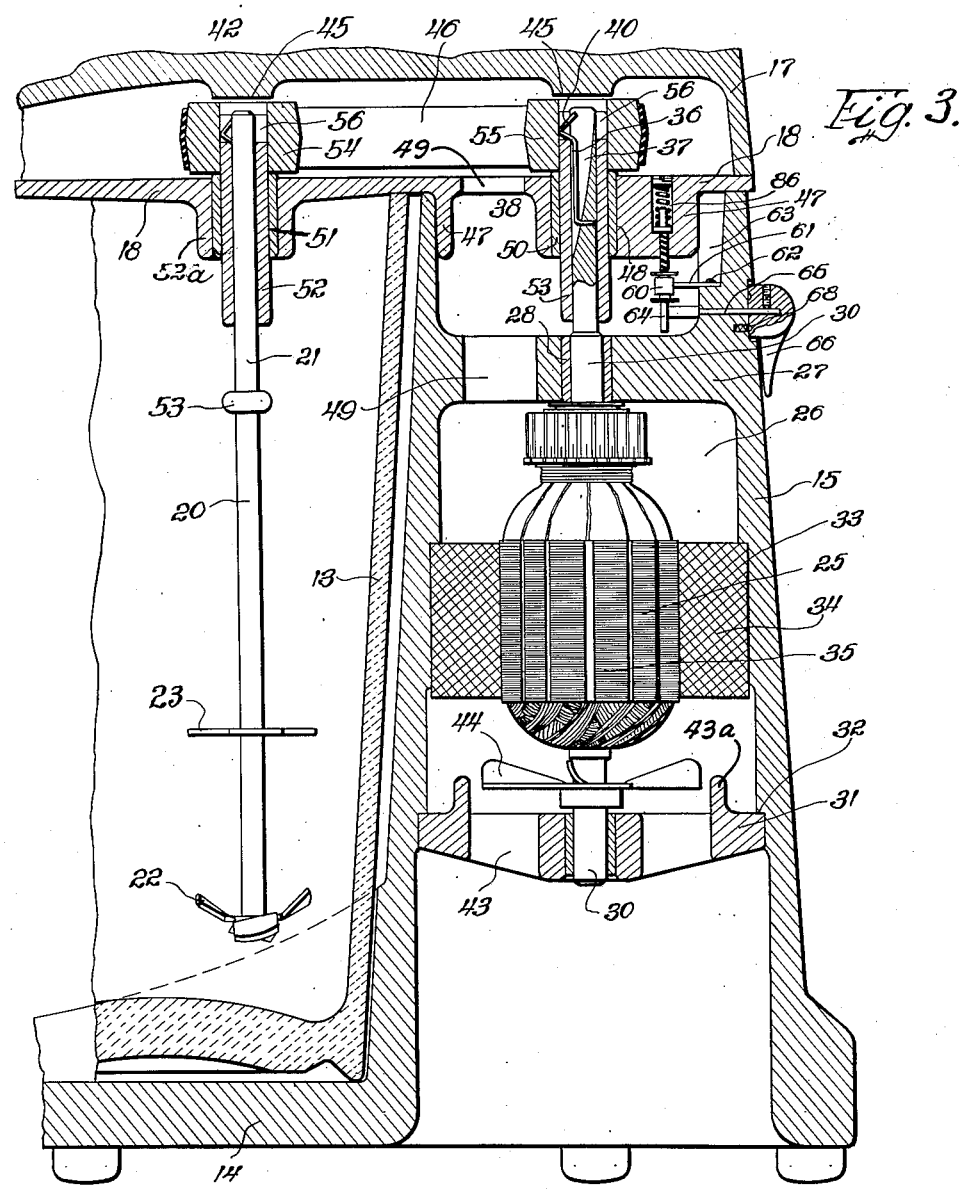
Fig. 3 is a partial vertical section showing the internal arrangement of the motor and transmission elements.

The mixer 10, as shown in Figs. 1 and 2, comprises a casing 11, a transmission housing 12, and a glass mixing cup 13. The housing 11 is preferably formed by die casting and consists of a base portion 14 and a hollow upright motor containing portion 15. The top side of the base portion 14 is cut away as shown in Fig. 3 to form a platform on which the mixing cup 13 rests. The housing 12 is formed of two pieces of metal, a cover member 17 and a base plate 18 which is received on the upper end of the casing 11, the plate 18 extending over the top of the cup 13.

The general arrangement of the parts and the construction of the mixing agitator has been described in my copending application for Drink Mixer Agitator, Serial No. 21,717, filed April 17, 1948, reference to which is hereby made. The agitator 20 comprises a shaft 21 journaled in the housing 12 and having impeller elements 22 and a disintegrator element 23 mounted on its lower end.

A series wound motor 25 is mounted in the hollow portion 26 within the casing 11. The casing 11 serves not only to house the motor 25 but also to support the individual elements of the motor in the proper relationship to one another. A web 27, formed integrally with the casing 11 is provided with a central hole which supports a sleeve bearing 28 for the upper end of the armature shaft 30. The lower end of the armature shaft 30 is supported in a circular member 31 which is pressed against a shoulder 32 provided in the wall of the cavity 26. Another shoulder 33 in the hollow 26 serves to support the motor field coil 34 in the proper relationship with the armature 35. The upper end of the armature shaft 30 extends beyond the top of the casing 11, and is provided with a spring 36 received in a milled slot 37 in the top of the shaft 30. The spring 36 has the shape shown in Fig. 3 and is bent so as to tend to spring outwardly from the shaft. The edges of the slot 37 are deformed slightly inwardly to limit outward travel of the upper end of the spring 36 to the position shown. Thus the outwardly bent portion 40 on the upper end of the spring 36 tends to remain in the position shown but may be moved inwardly against the force of the spring 36 so as to lie wholly with the slot 37.

The upper end of the agitator shaft 21 is formed exactly the same as the end of the motor shaft having the same dimensions, and the parts receiving the end of the agitator shaft are, therefore, identical with those to which the motor shaft is coupled.

The plate-like element 31 supporting the bottom of the armature shaft 30 is provided with a plurality of openings 43 which allow the passage of air to the cavity 26 for purposes of cooling the motor 25. A fan or impeller 44 is disposed directly above the plate 41 and serves to draw air through the openings 43 when the motor 25 is running. A projecting ring 43a on the plate 41 forms a shroud around the fan 44. Other openings 49 are provided in the web 27 and the housing base plate 18 so that air from the cavity 26 flows into the housing 12 to cool the transmission elements. Other openings 49a in both ends of the cover 17 permit the exit of air from the housing.

As has been stated the transmission housing 12 is formed in two pieces 17 and 18. The cover portion 17 serves as a protective cover for the transmission elements. Two projecting portions 45 extend crosswise within the housing 12 and prevent the belt 46 from becoming displaced and one of them also serves to prevent the agitator shaft 21 from being inserted too far into the housing 12.

A lower portion 18 of the housing 12 is substantially in the form of a flat plate having downwardly extending projections thereon. One of these projections 47 has a circular periphery and sets snugly into the top of the casing 11 to hold the housing 12 in the proper position when it is mounted upon the casing 11. A key and key-way (not shown) integrally formed on the plate 18 and the top of the casing 11 serve to prevent rotation of the housing 12 from the proper position with respect to the casing 11. The central part of the projection 47 is provided with a hole 48 receiving a bearing member 50. An identical bearing 51 is supported in a projection 52a on the element 18 over the mixing vessel 13. Each of the bearings 50 and 51 rotatably supports a sleeve element, the two elements 52 and 53 again being identical.

The pulleys 54 and 55 are mounted on the upper ends of the sleeve elements 52 and 53, the sleeves 52 and 53 being pressed into the pulleys 54 and 55 so as to be fixed thereto. The belt 46 runs on the pulleys 54 and 55 and is preferably formed of rubber or other elastic material so that a tensioning adjustment need not be provided. Each of the pulleys 54 and 55 is slightly larger in diameter at its center, this shape tending to cause the belt to remain in the proper running position. The upper end of each of the sleeves 52 and 53 is provided with two slots 56 cut at right angles to each other so that the agitator and the motor shaft need only be rotated through 90° until the spring element 40 and 42 springs outwardly into one of the slots 56 to lock the motor or agitator shaft to its respective sleeve. Thus the outwardly bent portions of the springs 40 and 42 serve dual functions, as key-ways for preventing rotation of the shafts independently of the sleeves and as locking elements which tend to hold the shafts in the sleeves unless sufficient force is exerted to overcome the spring tension.

Thus it will be seen that all of the transmission elements are identical which greatly simplifies manufacturing and makes it unnecessary to stock extra replacement parts as would be the case were the driven end, for example, different from the driving end.

From the foregoing it will be seen that all that need be done to remove the transmission housing 12 from the casing 11 is to pull upwardly on the housing 12 causing the end of the spring 36 to move inwardly so that the sleeve 53 may be slipped off of the shaft 30. Thus the spring 36 also serves to hold the housing 12 tightly against the top of the casing 11.

When the housing 12 has been removed from the casing 11 the agitator 20 may be readily removed from the housing 12 by grasping it with the fingers and pulling it out of the sleeve 52. For this purpose a ring 57 is provided on the agitator 20 disposed high enough to remain free of the ingredients being mixed. When the housing 12 has been removed from the casing 11, the mixing cup 13 is free to be lifted off the platform formed on the casing 14. To aid in holding the cup 13 in position during mixing, the platform portion has a cavity the same size as the bottom of the cup 13 and of such a depth that the lower portion of the cup may not be moved out of the cavity when the housing 12 is in place.

The control switch 60 is similar in some respects as that shown in my copending application for Switch, Serial No. 14,600, filed March 12, 1948, patented August 29, 1950, No. 2,520,441, reference to which is hereby made.

However, the switch of this invention performs an additional function over that disclosed in my copending application and although somewhat similar in appearance differs in its operation.

The location of the switch 60 within the mixer 10 is shown in Figs. 3 and 5. The switch 60 is attached to an insulating bracket 61 which is in turn secured to the casing 11 by a pair of screws 62, a recessed portion 63 being provided in the casing 11 in order that the switch 60 may be disposed in the proper position.

The switch 60 is manually actuated by rotation of a cam 64 attached to the end of the shaft 65 journaled in the wall of the casing 11, a knob or lever 66 being attached to the outer end of the shaft 65. A spring detent 68 in the wall of the casing 11 serves to hold the knob in either the "off" or "on" position.

Figure 4:
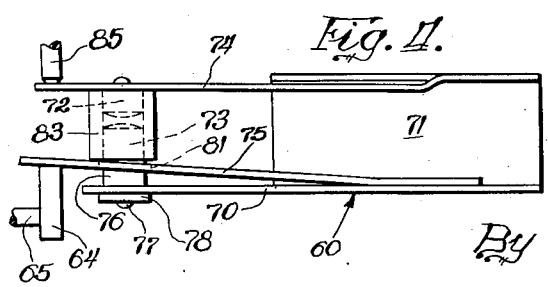
Fig. 4 is an enlarged view showing the control switch of this invention.

The construction of the switch proper 60 is best shown in Fig. 4. The switch 60 comprises a base plate 70 of insulating material, an insulating spacer 71, a pair of contacts 72 and 73 and two resilient members 74 and 75 fixed to the spacer block 71. The lowermost contact 73 is supported on the member 70 being separated therefrom by an insulating spacer 76, the lower end of the contact 73 projecting through the spacer 76 and the member 70 and being peened over as indicated at 77 to hold the contact 73 rigidly to the member 70. A terminal lug 78 is in contact with the peened over portion 77 and thereby is electrically connected to the contact 73.

The upper contact 72 is attached directly to the member 74. The resilient member 74 is bent so as to tend to rest in position shown in Fig. 7 when unstressed.

The lowermost resilient member 75 extends beyond the end of the member 70 and is provided with a hole 81 through which the contacts 73 and spacer 76 extend. When the knob 66 is rotated to the position shown in Fig. 8, the member 75 which normally lies against the member 70 is forced upwardly to the position as shown in Fig. 4 carrying with it an insulating sleeve 83 which transmits its motion to the member 74 and serves to move the member 74 and contact 72 upwardly. When the knob 66 is turned to the position shown in Fig. 6 the cam 64 is rotated 180° and allows the member 75 and sleeve 83 to move downwardly to the position shown in Fig. 8.

To actuate the switch 60 when the housing 12 is in place, a piston-like member 85 is provided in the plate 18 to support this member, an opening 86 is provided in the plate 18 from the upper end thereof, a hole 87 extending from the bottom of this opening through the plate 18. The member 85 is rod-like in form having a larger diameter upper portion 88 which normally rests against the bottom of the cavity 86. A spring 90 tends to force a member 85 downwardly to the limit of its travel and a set screw 91 received in the top of the opening 86 supports the upper end of the spring 90 and also provides a means for adjusting the tension. The end of the member 85 projects from the bottom of the plate 88 and when the housing is in place serves to force the member 74 and the contact 72 downwardly to the position shown in Fig. 6 providing the knob 66 is in the "on" position.

When the knob 66 is rotated to the "off" position, the various elements are disposed as shown in Figs. 4 and 8, the member 75 being moved upwardly lifting the sleeve 83 and the member 74, the spring 90 being compressed as the member 85 moves upwardly, the contacts 72 and 73 separating.

When the knob 66 is in the "off" position as shown in Fig. 8 and the housing 12 is lifted off of the casing 11, the various elements assume the positions shown in Fig. 7. The member 74 springing upwardly as the member 85 is lifted away and the contacts 72 and 73 separating to open the circuit as the member 74 is free to move upwardly.

The switch 60 is connected in one of the line conductors (not shown) of the motor. Thus when the switch is open, the motor is deenergized and when it is closed is energized, no additional switches being required.

Since the switch of this invention may be opened slowly if the knob 66 is turned slowly or if the housing is removed slowly, its contacts might be likely to arc and deteriorate except for the snuffing action of the sleeve 83 which serves to rapidly extinguish any arc formed in the manner described in my copending application referred to above.

From the foregoing description it will be readily apparent that a superior drink mixer having several novel features which may be readily adapted to other types of mixers has been provided.

Various changes and modifications such as will present themselves to those familiar with the art may be made in the embodiment described without departing from the spirit of the invention whose scope is defined by the following claims.

What is claimed is:

1. A ventilating system for a mixer of the type having a casing enclosing a motor, a readily removable hollow housing attached to said casing at the top thereof and containing power transmission elements for transmitting power from the motor to a mixing agitator, said ventilating system comprising an air inlet in the bottom of the casing, an air outlet in said housing at a point remote from the point of attachment to the casing, and an impeller on the shaft of said motor for moving air upwardly from said casing into said housing in contact with said transmission elements to cool said motor and said transmission elements, said housing and casing having openings which are aligned when said housing is supported on the casing, said openings connecting the interiors of the housing and casing to provide for the free flow of air from one to the other.

2. In a ventilating system for a mixer of the type having a casing enclosing a vertically disposed motor, a readily removable hollow transmission housing removably supported on the top of said casing, and means in said housing for transmitting power from said motor to a mixing agitator, said system comprising an impeller on said motor shaft for moving air upwardly through said casing, an air inlet at the bottom of said casing and an air outlet on the end of said housing remote from said casing, said housing and casing having additional openings therein circulating air in contact with the working elements of said power transmitting means.

3. A ventilating system for a mixer of the type having a rotatable mixing element, a casing enclosing a motor, a hollow transmission housing removably attached to said casing, and means in said housing for transmitting motion from said motor to said mixing element, said system including an impeller on the shaft of said motor for drawing air into said casing, an opening from said casing into said housing providing for the flow of air from said casing into said housing in contact with the working elements of said means for transmitting motion to cool same, and an air outlet opening in the wall of said housing providing an exit for air from said mixer.

4. A ventilating system for a mixer of the type having a casing, a motor mounted within said casing, a hollow transmission housing attached to said casing, and means in said housing for transmitting motion from the shaft of said motor to a mixing element, said system including an opening from said casing into said housing providing for the flow of air from one to the other to circulate air in contact with the movable elements of said means for transmitting motion to cool same, an impeller on said shaft of said motor for moving air through said casing, and openings in the walls of said housing and casing providing for the flow of air between the atmosphere and the housing and casing.

FRED C. SCHWANEKE.

REFERENCES CITED

The following references are of record in the file of this patent:

UNITED STATES PATENTS

| Number | Name | Date |
|---|---|---|
| 1,720,355 | Scott | July 9, 1929 |
| 1,909,783 | McWhirter | May 16, 1933 |
| 2,013,887 | Jeppsson | Sept. 10, 1935 |
| 2,019,807 | Brown et al. | Nov. 5, 1935 |
| 2,021,626 | Flegel | Nov. 19, 1935 |
| 2,278,187 | Strauss et al. | Mar. 31, 1942 |
| 2,282,866 | Hagen | May 12, 1942 |
| 2,430,769 | Hutchinson | Nov. 11, 1947 |
| 2,452,268 | Schumann | Oct. 26, 1948 |